Patented Sept. 19, 1933

1,927,640

UNITED STATES PATENT OFFICE

1,927,640

CANDY AND METHOD FOR MAKING SAME

Henry G. Granger, New York, N. Y.; Maria C. Granger, administratrix of the estate of said Henry G. Granger, deceased No Drawing. Application May 15, 1926
Serial No. 109,365

3 Claims. (Cl. 99—16)

This improvement relates in general to a food compound and more especially to a candy or the like embracing as a part thereof a medicament.

The medicinal value of phosphate of calcium and its allied salts for tonifying, strengthening and fortifying the human body, and especially as a lime restorer for the human body in the treatment of certain diseases of the bones and teeth is well known. It is also well known that certain foods, more generally classified as confections, such as candy, cakes, crackers and the like, have a great affinity for the lime properties of the human blood and require the same in order properly to be assimilated in the digestive tract. In line with the foregoing, it is also well established that many of the diseases of the teeth and bones are directly due to robbing the blood of the lime needed for the bones and teeth, by the continued excessive eating of sweets, confections, candy and the like.

In view of the foregoing, the present invention has for a special object to provide a candy having embodied therein a lime restoring element such as phosphate of calcium or its allied salts.

The present invention further aims to provide a candy in which a food product serves as the vehicle or carrier for the medicament, phosphate of calcium or its allied salts, in which form the medicament will be pleasant to take, without at the same time making it necessary for the patient or user to attend to the proportion prescribed. In other words, the amount of medicament will be automatically determined by the amount of solid food products consumed by the patient. It is of course well known to coat with sugar, chocolate and the like various medicaments put up in various forms such as pills. However with such sugar coated pills there is no attempt made automatically to regulate the amount of medicament to be used.

It is a further object of the present invention to provide a food compound composed of a predetermined quantity of a lime and phosphorus forming medicament and a food product such as candy, confections and cakes, which latter draw upon the blood for an excess amount of lime, literally impoverishing the blood of the amount of lime necessary properly to nourish the osseous and dental structures of the human body, whereby the lime forming medicament will automatically replenish the lime extracted from the blood, or supply the lime necessary for assimilating the sugar excess in candy, cakes and the like and thus leave the blood unaffected by the consumption of food products containing an excess of sugar.

Excellent results have been obtained by embodying in a food product of the ordinary composition of bread, cakes, crackers and candy, a salt composed of phosphate of calcium, $Ca_3(PO_4)_2$, calcium hypophosphite, $Ca_3(HPO_3)_2$, glycerophosphate of calcium, $Ca_3H_5(OH)_2PO_4$, calcium phosphate chloride, $Ca_3H_5OHClPO_4$, or calcium lacto phosphate, $Ca_2C_3H_5O_3PO_4$, with their proper solvents, in the proportion of one to three parts of salt to ninety-nine to ninety-seven parts of food product respectively.

The present invention still further aims to provide a food compound composed of a food product such as candy and a lime and phosphorus forming salt, in which the salt is imperceptible to the taste, thereby to overcome the prejudices of the fastidious or of those to whom the taking of medicine is offensive or unpleasant. The present invention also aims to provide a food compound composed of a food product and a lime and phosphorus forming medicament, in which the medicament is readily soluble and thus places the manufacture of this food compound within the province of the average housewife and the average candy maker, baker and the like. Of the several salts above mentioned, it has been found that glycerophosphate of calcium will meet the aforesaid requirements, it being practically tasteless and readily soluble in the average dough mixture and candy mass.

The present invention also aims to produce a food compound composed of a food product such as candy, a lime and phosphorus supplying medicament, an iron supplying medicament and an iodine supplying medicament. To this end it has been found that excellent results have been produced in the following proportions, assuming the resulting compound to weigh two hundred grams: One to three parts phosphate of calcium or an allied salt as compared to one hundred parts of the resulting food compound, a three-tenths part of iron as compared to one hundred parts of the resulting food compound, and one to three drops of iodine as compared to one hundred parts of the resulting food compound.

When making ordinary hard candy, such as lemon drops, the medicament glycerophosphate of calcium may be introduced and thoroughly disseminated throughout the candy without in any way affecting the appearance, odor and taste of the candy, and without in any way causing bubbling, effervescing, or any semblance of fermentation so objectionable in the making of candy and especially in the making of hard candy.

In the manufacture of translucent hard candy such as lemon drops, for a small batch, it is customary to place in a container, kettle, or the like, about two pounds of corn syrup, or invert sugar as a doctor, about ten pounds of sucrose or common cane sugar, and two quarts of water, heat with the usual precautions, having regard for the condition of the fire and cleanliness of the kettle, and when the resulting mass comes to a boil, insert a thermometer and continue to heat until a temperautre of 300° F. to 310° F. has been reached and then pour the mass on a cooling table, there mix in the desired vegetable color, thereupon when the mass has been cooled to a consistency of a thick paste, add one and one-half ounces of powdered citric acid and one-half ounce of lemon oil, and thoroughly knead the mass so that the added ingredients are thoroughly mixed and disseminated throughout.

The present invention also has as a special object to produce a food compound composed of a food product having the composition of whole wheat crackers and a medicament composed of glycerophosphate of calcium or an allied salt.

It is obvious that various changes and modifications may be made in the percentages and ingredients above referred to without departing from the general spirit of the invention as set forth in the appended claims.

It is also obvious that by means of the aforesaid food compound even a gluttonous child will not be injured by eating as freely as desired crackers, cake, candy and similar compounds, and on the contrary will actually be physically improved.

I claim:

1. The method of making sugar products rich in lime which consists in adding to the sugar product an acid calcium phosphate together with a lime salt.

2. A sugar product with which is incorporated an acid phosphate and a lime salt.

3. A sugar product with which is incorporated a colloidal lime product.

HENRY G. GRANGER.